(12) United States Patent
Okada (10) Patent No.: US 10,627,523 B2
(45) Date of Patent: Apr. 21, 2020

(54) CONTROL DEVICE AND ASSIST SYSTEM

(71) Applicant: DENSO CORPORATION, Kariya, Aichi-pref. (JP)

(72) Inventor: Minoru Okada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 330 days.

(21) Appl. No.: 15/575,823

(22) PCT Filed: Apr. 26, 2016

(86) PCT No.: PCT/JP2016/002193
§ 371 (c)(1),
(2) Date: Nov. 21, 2017

(87) PCT Pub. No.: WO2016/194294
PCT Pub. Date: Dec. 8, 2016

(65) Prior Publication Data
US 2018/0210088 A1 Jul. 26, 2018

(30) Foreign Application Priority Data
Jun. 2, 2015 (JP) ................................ 2015-112211

(51) Int. Cl.
*G01S 19/06* (2010.01)
*G01S 19/48* (2010.01)
(Continued)

(52) U.S. Cl.
CPC .............. *G01S 19/06* (2013.01); *G01S 19/48* (2013.01); *G01S 19/51* (2013.01);
(Continued)

(58) Field of Classification Search
CPC .......... G01S 19/06; G01S 19/48; G01S 19/51; G01S 19/15; G01S 19/252; G01S 19/09; G01S 19/46
(Continued)

(56) References Cited

U.S. PATENT DOCUMENTS

2012/0271540 A1* 10/2012 Miksa .................... G01C 21/30
701/409
2012/0296539 A1* 11/2012 Cooprider ............. B60W 10/06
701/70
(Continued)

FOREIGN PATENT DOCUMENTS

JP 2002311122 A 10/2002
JP 2003299140 A 10/2003
(Continued)

*Primary Examiner* — Harry K Liu
(74) *Attorney, Agent, or Firm* — Harness, Dickey & Pierce, P.L.C.

(57) ABSTRACT

A control device is provided with: a position acquisition section for acquiring a current location; an information acquisition section for acquiring, from a specific device, device position information including a device position indicating the position of the specific device; a storage control section for storing the current position of the control device into a nonvolatile storage device; and a control execution section for executing driving assist control based on a current-time position of the control device and the device position information. The control execution section is provided with: a distance calculation section for calculating a distance between the device position and the stored position; and a distance determination section for determining whether or not the device-to-device distance is smaller than a distance threshold which is a prescribed distance.

(Continued)

When the device-to-device distance is smaller than the distance threshold, the control execution section starts execution of the assist control.

8 Claims, 4 Drawing Sheets

(51) Int. Cl.
    *G08G 1/0967*     (2006.01)
    *G01S 19/51*     (2010.01)
    *H04W 4/02*     (2018.01)
    *H04W 4/46*     (2018.01)
    *H04W 4/44*     (2018.01)
    *G08G 1/01*     (2006.01)

(52) U.S. Cl.
    CPC ... *G08G 1/09675* (2013.01); *G08G 1/096725* (2013.01); *G08G 1/096741* (2013.01); *G08G 1/096783* (2013.01); *G08G 1/0112* (2013.01); *G08G 1/0116* (2013.01); *G08G 1/0141* (2013.01); *G08G 1/096708* (2013.01); *G08G 1/096791* (2013.01); *H04W 4/023* (2013.01); *H04W 4/44* (2018.02); *H04W 4/46* (2018.02)

(58) Field of Classification Search
    USPC .................................................. 342/357.43
    See application file for complete search history.

(56) References Cited

U.S. PATENT DOCUMENTS

| | | | |
|---|---|---|---|
| 2014/0107866 A1 | 4/2014 | Hamaue et al. | |
| 2014/0379254 A1* | 12/2014 | Miksa | G01C 21/32 701/450 |
| 2015/0057834 A1* | 2/2015 | Morimoto | B62D 15/029 701/1 |

FOREIGN PATENT DOCUMENTS

| | | |
|---|---|---|
| JP | 2011112590 A | 6/2011 |
| JP | 5239804 B2 | 7/2013 |
| JP | 2014053713 A | 3/2014 |
| JP | 2014082539 A | 5/2014 |

* cited by examiner

CONTROL DEVICE AND ASSIST SYSTEM

CROSS REFERENCE TO RELATED APPLICATIONS

This application is a U.S. National Phase Application under 35 U.S.C. 371 of International Application No. PCT/JP2016/002193 filed on Apr. 26, 2016 and published in Japanese as WO 2016/194294 A1 on Dec. 8, 2016. This application is based on and claims the benefit of priority from Japanese Patent Application No. 2015-112211 filed on Jun. 2, 2015. The entire disclosures of all of the above applications are incorporated herein by reference.

TECHNICAL FIELD

The present disclosure relates to a control device and an assist system having the control device.

BACKGROUND ART

There is known an in-vehicle control device provided with an information acquisition section that acquires information from a roadside device, and a control execution section that executes assist control based on the information acquired in the information acquisition section (refer to Patent Literature 1, for example).

The in-vehicle control device of Patent Document 1 receives information concerning a light color of an intersection signal from the roadside device. When the light color of the intersection signal in accordance with the received information indicates "prohibit entry" at the point when a subject vehicle enters the intersection, issuance of a warning is executed as assist control.

PRIOR ART LITERATURES

Patent Literature

Patent Literature 1: JP 5239804 B2

SUMMARY OF INVENTION

When the assist control is to be executed in the in-vehicle control device, it is important to accurately obtain a distance from the subject vehicle to the intersection and the timing for the subject vehicle to enter the intersection. For accurately obtaining the distance from the subject vehicle to the intersection and the timing for the subject vehicle to enter the intersection, an accurate current position of the subject vehicle needs to be detected.

As a method for detecting the current position, satellite navigation is often used in which signals from multiple navigation satellites are received in a receptor, and the latitude and longitude of the current position are derived from the received signals. In the satellite navigation, orbit information on each of the navigation satellites needs to be acquired after activation of the receptor, and in some cases, it might take several tens of seconds to specify a highly reliable current position.

In other words, in the conventional in-vehicle control device, accurate specification of the current position may be difficult immediately after activation of the receptor, and it might not be possible to start executing the assist control immediately after the activation.

It is an object of the present disclosure to provide a technique for making assist control executable at an early point.

According to one example of the present disclosure, a control device includes a position acquisition section, an information acquisition section, a storage control section, and a control execution section.

The position acquisition section acquires a current position derived from a signal received from a navigation satellite. The information acquisition section acquires device position information including a device position that represents a position of a specific device, being another device or a roadside device, from the specific device.

The storage control section stores into a nonvolatile storage device the current position of the control device, acquired in the position acquisition section, when a power switch is switched to an off-state. The control execution section executes driving assist control when the power switch enters an on-state, based on a current-time position representing a position at a point when the power switch enters the on-state and on the device position information from the specific device.

The control execution section includes a distance calculation section and a distance determination section.

The distance calculation section calculates a device-to-device distance which is a distance between the device position acquired in the information acquisition section and a stored position being the current position stored in the nonvolatile storage device, based on the device position and the stored position. The distance determination section executes distance determination to determine whether the device-to-device distance calculated in the distance calculation section is smaller than a distance threshold which is a prescribed distance.

When the device-to-device distance is smaller than the distance threshold as a result of the distance determination in the distance determination section, the control execution section sets the stored position as the current-time position of the control device and starts to execute the driving assist control.

In such a control device, when the power switch enters the off-state, the current position of the control device at that point is stored into the nonvolatile storage device. When the power switch enters the on-state, it is determined whether the distance between the current position (that is, the stored position) of the control device and the device position (that is, the device-to-device distance) is smaller than the distance threshold, the current position being stored in the nonvolatile storage device, the device position having been acquired after the power switch entering the on-state.

When the device-to-device distance is smaller than the distance threshold as a result of this determination, it is determined that the control device has not moved while the power switch is in the off-state. The control device then sets the stored position being stored in the nonvolatile storage device as the current position at that point (that is, a current-time position).

Further, according to another example of the present disclosure, an assist system executes assist control in accordance with a result of wireless communication between a control device and a specific device being another device or a roadside device. The specific device includes an information transmission part that transmits device position information including a device position which represents a position of the specific device.

According to the control device or the assist system of the present disclosure, it may be possible to set a highly reliable current-time position at an early point immediately after the power switch entering the on-state.

Thus, according to the control device or the assist system, it may be possible to execute assist control at an early stage immediately after the power switch entering the on-state.

BRIEF DESCRIPTION OF DRAWINGS

The above and other aspects, features and advantages of the present disclosure will become more apparent from the following detailed description made with reference to the accompanying drawings. In the drawings:

FIG. 5 is a flowchart showing a process procedure with an ignition on;

DESCRIPTION OF EMBODIMENTS

An embodiment of the present disclosure will be described along with the drawings.

(Driving Assist System)

Figure 1:
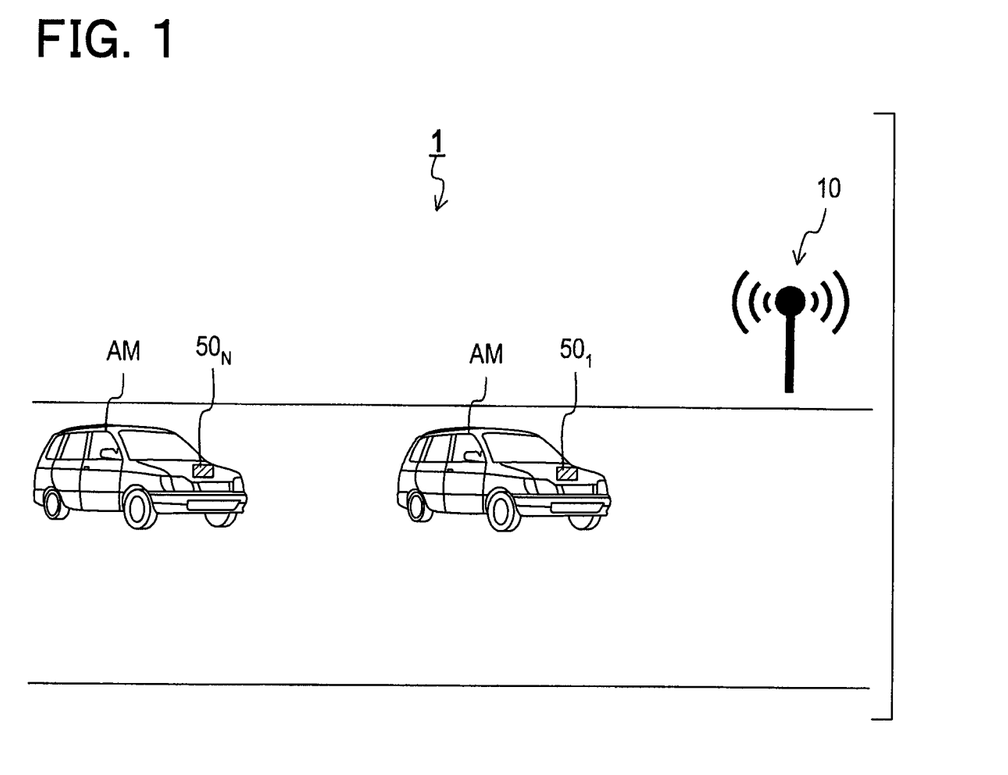
FIG. 1 is a diagram showing a schematic configuration of a driving assist system.

A driving assist system 1 shown in FIG. 1 is provided with at least one roadside device 10 installed on a road, and control devices 50₁ to 50ₙ mounted in respective four-wheeled vehicles AM.

Symbol "N" shown in FIG. 1 is an identifier to identify a control device 50 and a natural number being one or larger. One of the four-wheeled vehicles AM mounted with the control device 50 is referred to as a subject vehicle (also referred to as a first vehicle). A four-wheeled vehicle AM, other than the subject vehicle, of the four-wheeled vehicles AM mounted with the control device 50 is referred to as the other vehicle (also referred to as a second vehicle or another vehicle). The control device 50 mounted in the subject vehicle is referred to as an in-vehicle control device 50, and the control device 50 mounted in the other vehicle is referred to as the other-vehicle in-vehicle control device 50. The roadside device 10 and the other-vehicle in-vehicle device 50 are each an example of the specific device of the present disclosure.

In the driving assist system 1, the in-vehicle control device 50 executes driving assist control for assisting driving of the subject vehicle, based on information received from the roadside device 10 and information received from the other-vehicle in-vehicle device 50.

(Roadside Device)

The roadside device 10 is a device installed in the vicinity of an intersection where a traffic signal is installed, and transmits prescribed information (hereinafter referred to as "roadside-device information") by wireless communication. An example of the wireless communication mentioned here is a known road-to-vehicle communication.

Figure 2:
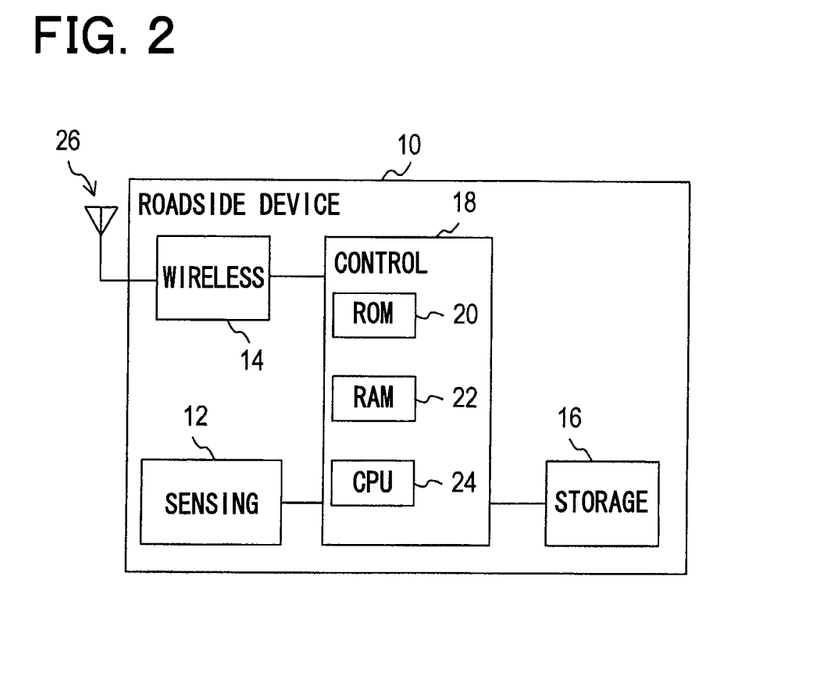
FIG. 2 is a block diagram showing a schematic configuration of a roadside device.

As shown in FIG. 2, the roadside device 10 is provided with a sensing part 12, a wireless communication part 14, a storage part 16, and a control part 18.

Among these, the sensing part 12 is a sensor that repeatedly senses a situation in the vicinity of the place installed with the roadside device 10. The sensor of the present embodiment includes, for example, a situation monitoring device that monitors a situation of vehicles traveling on the road installed with the roadside device 10, obstacles present on the road, pedestrians, and the like (hereinafter referred to as "on-road situation"). The situation monitoring device includes a known camera that monitors the on-road situation based on a result of capturing an image in the vicinity of the roadside device 10 and processing the image, and a known vicinity monitoring device that monitors the on-road situation in accordance with a result of applying an exploration wave and receiving a reflective wave of the applied exploration waves. The vicinity monitoring device mentioned here is an infrared radar that transmits and receives an infrared ray as the exploration wave, a milli-wave radar that transmits and receives an electromagnetic wave in a milli-wave zone as the exploration wave, a sonar that transmits and receives a sonic wave as the exploration wave, or the like.

Further, the sensors of the present embodiment include a light monitoring device that monitors a situation of a light color (hereinafter referred to as a "light color situation") of the traffic signal. The light color situation mentioned here includes a cycle in which the light of the traffic signal changes, whether the current light color indicates "prohibit entry" or "permit entry", and the time remaining until the light color changes.

That is, the sensing part 12 repeatedly acquires the on-road situation and the light color situation at time intervals prescribed in advance.

The storage part 16 is a known storage part. As this storage device, for example, a rewritable nonvolatile storage device (for example, a hard disk drive, a flash memory, etc.) can be considered.

The wireless communication part 14 converts the roadside-device information including the on-road situation and the light color situation, acquired in the sensing part 12, to communication data and outputs the data via an antenna 26.

The control part 18 is a known control device made up mainly of a known microcomputer having a ROM 20, a RAM 22, and a CPU 24. The control part 18 controls each part 12, 14, 16 configuring the roadside device 10.

Further, the control part 18 generates roadside-device information including the on-road situation and the light color situation acquired in the sensing part 12, and transmits the information by known road-to-vehicle communication. The roadside-device information generated by the control part 18 includes a position where the roadside device 10 is installed (that is, the latitude and longitude, hereinafter referred to as a "roadside-device position"), and roadside-device identification information for identifying the roadside device 10. This roadside-device position is prescribed in advance for each roadside device 10, and is an example of the device position of the present disclosure.

(In-Vehicle Control Device)

Next, the configuration of the in-vehicle control device 50 will be described. Since the in-vehicle control device 50 is configured similarly to the other-vehicle in-vehicle device 50, the configuration of the in-vehicle control device 50 will be described and the configuration of the other-vehicle in-vehicle device 50 will be omitted.

The in-vehicle control device 50 transmits subject-vehicle information, which is information at least including the current position of the subject vehicle, by the known vehicle-to-vehicle communication, and executes driving assist control based on the roadside-device information received from the roadside device 10, information received from the other-vehicle in-vehicle device 50, and the current position of the subject vehicle.

Figure 3:
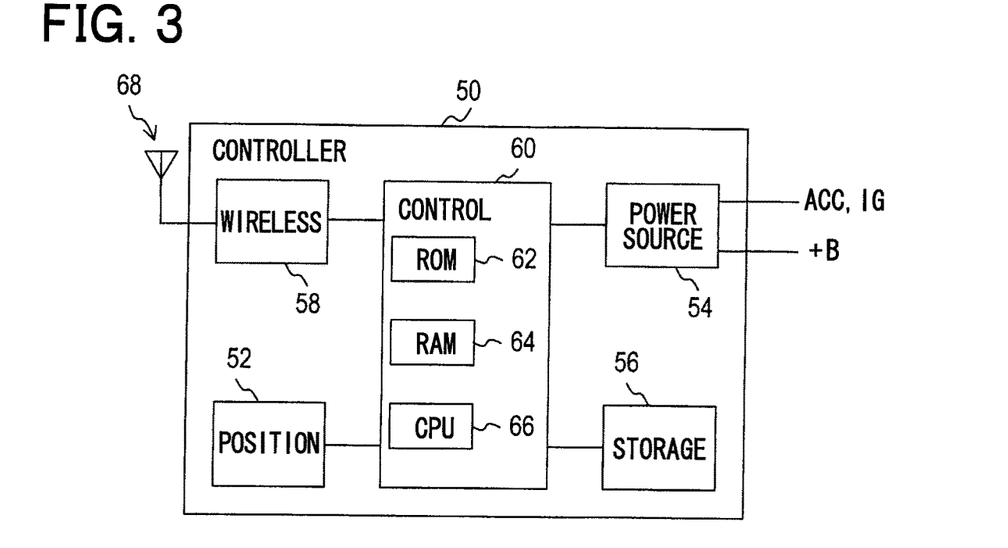
FIG. 3 is a block diagram showing a schematic configuration of a control device.

As shown in FIG. 3, the in-vehicle control device 50 is provided with a position acquisition part 52, a power source control part 54, a nonvolatile storage device 56, a wireless communication part 58, and a control part 60.

Among these, the position acquisition part 52 is a known configuration to acquire the current position (that is, the latitude and longitude) of the subject vehicle. This position acquisition part 52 includes a receptor that receives signal from a navigation satellite. That is, the position acquisition part 52 of the present embodiment specifies the current position by a known method in accordance with satellite navigation. The navigation satellite mentioned here is a satellite that achieves satellite positioning system, such as a GPS (Global Positioning System) satellite or a GLONASS (Global Navigation Satellite System) satellite.

Further, the position acquisition part 52 acquires a result of detection by a vehicle behavior sensor, such as a vehicle velocity sensor that detects a vehicle velocity of the subject vehicle or a gyro sensor that detects an angular velocity of the subject vehicle. When a signal cannot be received from the navigation satellite by known autonomous navigation in accordance with a result of detection by the vehicle velocity sensor or the gyro sensor, the position acquisition part 52 may specify the current position of the subject vehicle or correct the current position of the subject vehicle specified by the satellite navigation by the autonomous navigation.

That is, the position acquisition part 52 acquires information including the current position of the subject vehicle as subject-vehicle information. The subject-vehicle information of the present embodiment includes information representing the state of the subject vehicle, such as a vehicle velocity, a traveling direction, and the like of the subject vehicle, in addition to the current position of the subject vehicle. Further, the subject-vehicle information of the present embodiment may include identification information identifying the in-vehicle control device 50.

The power source control part 54 is a device that converts the voltage, obtained from the in-vehicle battery or the alternator mounted in the four-wheeled vehicle AM, to a voltage required for the in-vehicle control device 50. When the ignition switch enters the on-state, the power source control part 54 converts a voltage, obtained from the in-vehicle battery, to a voltage required for the in-vehicle control device 50, and the supplies the converted voltage to the in-vehicle control device 50. When the ignition switch enters the off-state, the completion of the process of the in-vehicle control device 50 is waited and the supply to a voltage to the in-vehicle control device 50 is finished.

The nonvolatile storage device 56 is a known rewritable nonvolatile storage. Examples of the nonvolatile storage device 56 to be considered include a hard disk drive, a flash memory, and the like.

The wireless communication part 58 outputs the subject-vehicle information from an antenna 68 by the known vehicle-to-vehicle communication, and also receives information (that is, information representing the state of the other vehicle, hereinafter referred to as "other-vehicle information") from the other-vehicle in-vehicle device 50 and the roadside-device information of the roadside device 10 via the antenna 68.

The control part 60 is a known control device made up mainly of a known microcomputer having a ROM 62, a RAM 64, and a CPU 66.

The control part 60 executes the driving assist control based on the roadside-device information received from the roadside device 10 and the other-vehicle information received from the other-vehicle in-vehicle device 50.

As an example of the driving assist control, there can be considered situation notification control in which a situation in the vicinity of a place installed with the roadside device 10 when the subject vehicle AM approaches the intersection in accordance with the roadside-device information received from the roadside device 10. In the situation notification control, for example, it is executed that the timing for the subject vehicle to enter the intersection is specified based on the current position of the subject vehicle, the position of the intersection, and the vehicle velocity of the subject vehicle, and the signal light color at the specified timing is notified.

Further, as another example of the driving assist control, there can be considered following assist control in which driving of the subject vehicle is assisted so as to follow behavior of the other vehicle AM in accordance with the other-vehicle information received from the other-vehicle in-vehicle device 50. In the following assist control, for example, it is executed that a distance between the subject vehicle and the other vehicle is calculated based on the current position of the subject vehicle and the current position of the other vehicle, and the control is performed so as to keep the calculated distance between the vehicles to be a prescribed distance prescribed in advance.

Each of the roadside-device information and the other-vehicle information in the present embodiment is an example of the device position information of the present disclosure.

The ROM 62 stores a process program for causing the control part 60 to execute a driving assist control process for executing the driving assist control. The ROM 62 corresponds to an example of the computer readable, non-transitory storage medium.

(Driving Assist Control Process)

Figure 4:
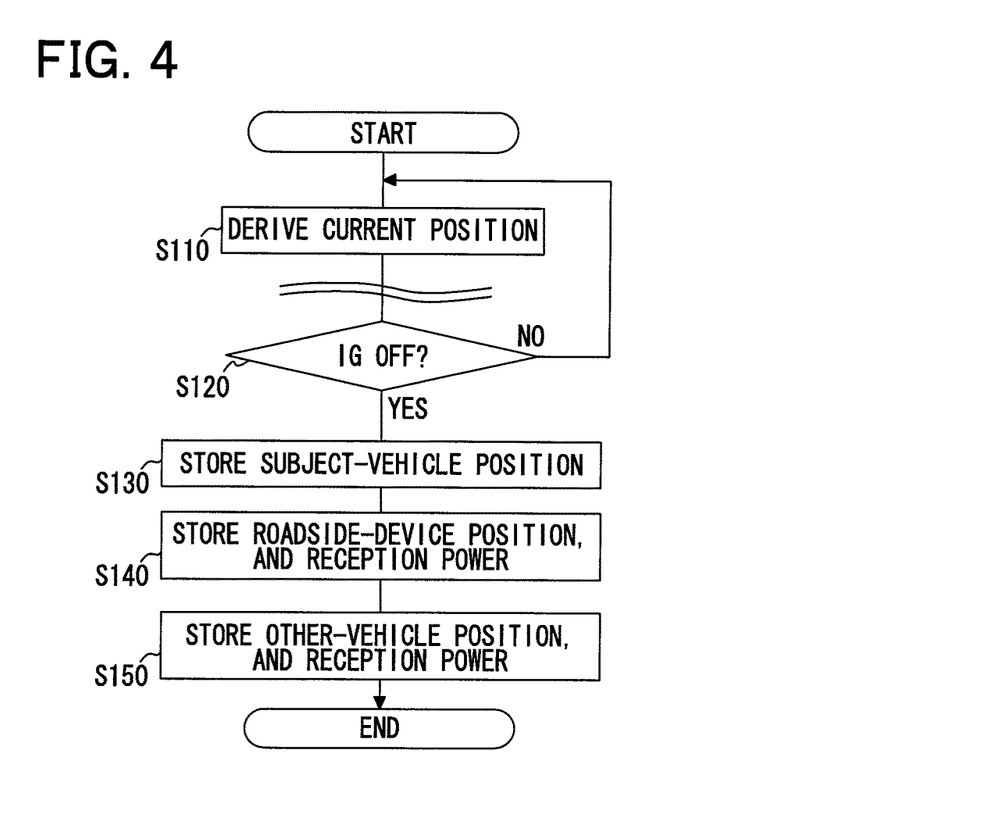
FIG. 4 is a flowchart showing a process procedure with an ignition off.
Figure 5:
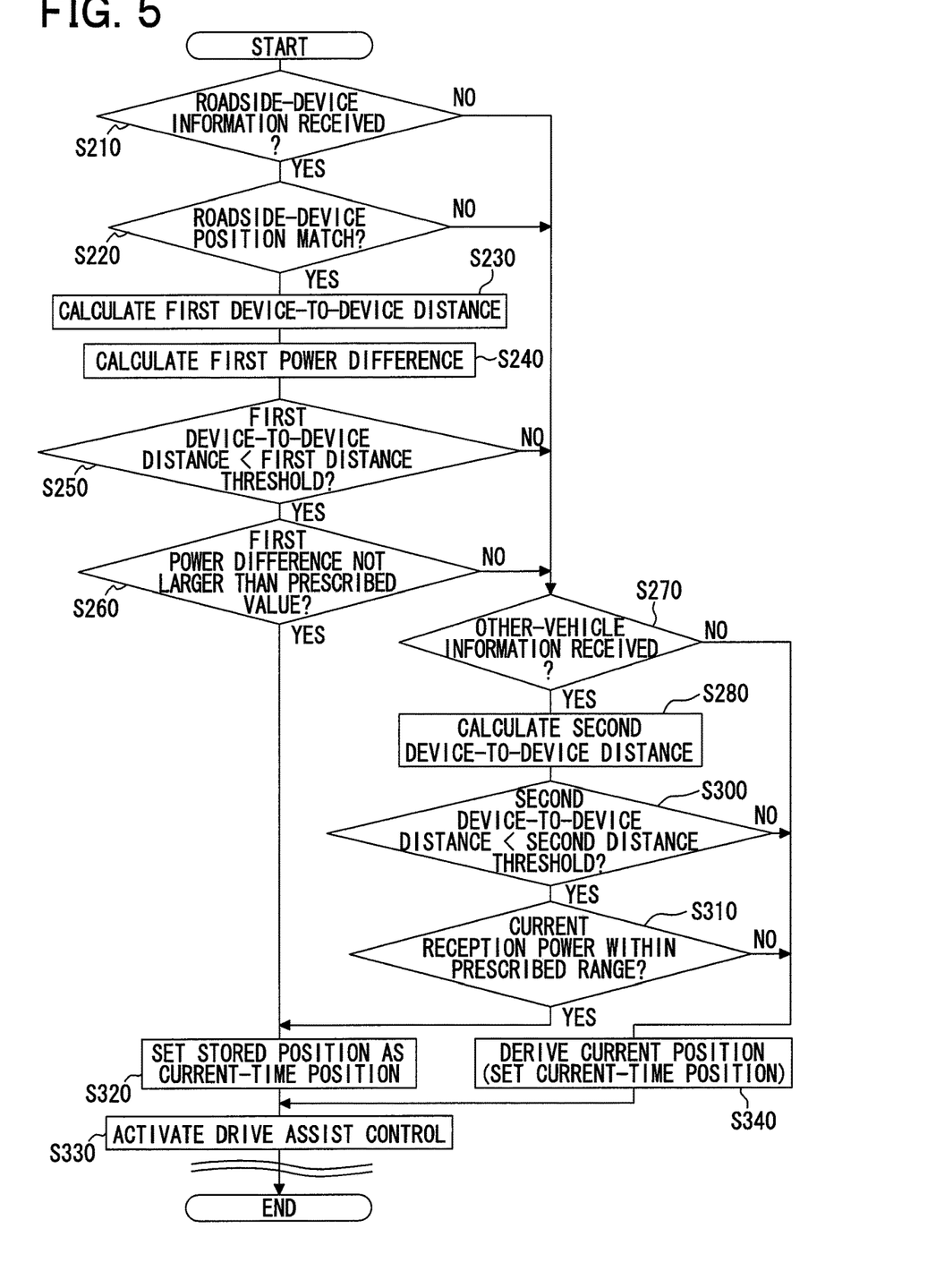

FIG. 4 is a flowchart showing a process procedure at the stage of finishing the driving assist control process. FIG. 5 is a flowchart showing a process procedure at the stage of activating the driving assist control process.

At the stage of finishing the driving assist control process, as shown in FIG. 4, the control part 60 derives the current position of the subject vehicle to the satellite positioning system by a known technique based on signals received from multiple (at least four or more) navigation satellites (S110). As for the method for deriving the current position of the subject vehicle in S110, the current position may be derived based on autonomous navigation, or may be derived by another technique.

Thereafter, in the driving assist control process, the control part 60 determines whether the ignition switch has been turned off (S120). As a result of the determination in S120, when the ignition switch has not been turned off (S120: NO), the control part 60 repeats a prescribed step until the ignition switch is turned off.

The ignition switch in the present embodiment is an example of the power switch of the present disclosure. The power switch is a switch that turns the power source on and off. When the power switch is turned off, the power source control part 54 waits for the process to be completed, and finishes the voltage supply.

When the ignition switch is then turned off (S120: YES), the control part 60 moves the process to S130. In S130, the control part 60 stores the subject-vehicle information at the present time, acquired from the position acquisition part 52, into the nonvolatile storage device 56. In S130, the subject-vehicle information stored into the nonvolatile storage device 56 at least includes the current position (the latitude and longitude) of the subject vehicle, having been derived in S110 immediately before moving of the process to S130.

Subsequently, when the roadside-device information acquired via the wireless communication part 58 is present after stopping of the vehicle, the control part 60 stores the roadside-device information into the nonvolatile storage device 56 (S140). In S140 in the present embodiment, the control part 60 stores, into the nonvolatile storage device 56, reception power for the roadside-device information in the wireless communication part 58 in association with the roadside-device information. The roadside-device information stored in the nonvolatile storage device 56 in S140 at least includes the roadside-device position (the latitude and longitude) of the roadside device.

Further, when the other-vehicle information acquired via the wireless communication part 58 is present after stopping of the vehicle, the control part 60 stores the other-vehicle information into the nonvolatile storage device 56 (S150). In S150 in the present embodiment, the control part 60 stores, into the nonvolatile storage device 56, reception power for the other-vehicle information in the wireless communication part 58 in association with the roadside-device information. The roadside-device information stored in the nonvolatile storage device 56 in S140 at least includes the current position (the latitude and longitude) of the other vehicle.

Thereafter, the control part 60 finishes the process, and the voltage supply from the power source control part 54 is blocked.

Next, the stage of activating the driving assist control process will be described. The driving assist control process is activated when the ignition switch enters the on-state.

As shown in FIG. 5, the control part 60 determines whether the roadside-device information has been received via the wireless communication part 58 (S210) at this stage of activating the driving assist control process. When the roadside-device information has not been received as a result of the determination in S210 (S210: NO), the control part 60 moves the process to S270 as described in detail later.

On the other hand, when the roadside-device information has been received as a result of the determination in S210 (S210: YES), the control part 60 executes position determination to determine whether the current roadside-device position matches the stored roadside-device position (S220). The current roadside-device position is a roadside-device position included in the roadside-device information received in S210. The stored roadside-device position is a roadside-device position that is included in the roadside-device information stored in the nonvolatile storage device 56. Further, the matching of the roadside-device positions mentioned in S220 of the present embodiment may mean that a difference in latitude and longitude is "0", or the difference in latitude and longitude may be within a prescribed permissible range.

When the current roadside-device position and the stored roadside-device position do not match each other as a result of the determination in S220 (S220: NO), the control part 60 moves the process to S270 as described in detail later. When the current roadside-device position and the stored roadside-device position match each other as a result of the determination in S220 (S220: YES), the control part 60 moves the process to S230 as described in detail later.

In S230, the control part 60 calculates a first device-to-device distance. The first device-to-device distance mentioned here is a distance from the current roadside-device position to the stored position. In S230 of the present embodiment, a linear distance between the latitude and longitude of the current roadside-device position and the latitude and longitude of the stored position may simply be calculated as the first device-to-device distance.

The stored position mentioned here is the current position of the subject vehicle, stored in the nonvolatile storage device 56, as well as the current position of the subject vehicle, having been specified immediately before the last turning-off of the ignition switch.

Subsequently, the control part 60 drives a first power difference (S240). The first power difference mentioned here is a difference between the current roadside-device information reception power and the stored roadside-device information reception power. Further, the current roadside-device information reception power is the roadside-device information reception power received in S210. The stored roadside-device information reception power is the roadside-device information reception power stored in the nonvolatile storage device 56, as well as the roadside-device information reception power having been received immediately before the last turning-off of the ignition switch. This stored roadside-device information reception power may be reception power for the roadside-device information having roadside-device identification information in common with the roadside-device identification information included in the roadside-device information received in S210.

The stored roadside-device information reception power is an example of the stored power of the present disclosure, and the current roadside-device information reception power is an example of the current reception power of the present disclosure.

In the driving assist control process, the control part 60 determines whether the first device-to-device distance is smaller than a prescribed first distance threshold (S250). The first distance threshold mentioned here is a distance from the roadside device 10 to the current position of the subject vehicle, which permits execution of the situation notification control as the driving assist control.

When the first device-to-device distance is not smaller than the first distance threshold as a result of the determination in S250 (S250: NO), the control part 60 moves the process to S270. On the other hand, when the first device-to-device distance is smaller than the first distance threshold as a result of the determination in S250 (S250: YES), the control part 60 moves the process to S260.

In S260, the control part 60 determines whether the first power difference is not larger than a prescribed value prescribed in advance. The prescribed value mentioned here is a value set assuming fluctuation in reception power which occurs due to a change in an ambient surrounding (a parked vehicle, etc.), and is set to a value of approximately 10 dB to 15 dB.

When the first power difference exceeds the prescribed value as a result of the determination in S260 (S260: NO), the control part 60 moves the process to S270. On the other hand, when the first power difference is not larger than the prescribed value as a result of the determination in S260 (S260: YES), the control part 60 moves the process to S320.

In S320, the control part 60 sets the stored position as the current-time position of the subject vehicle. The current-time position in the present embodiment is the position of the subject vehicle at the point in time when the ignition switch enters the on-state.

In the driving assist control process, the control part 60 subsequently activates and starts the driving assist control process based on the current position of the subject vehicle, the roadside-device information received from the roadside device 10, and the other-vehicle information received from the other-vehicle in-vehicle device 50, the current position being derived by the autonomous navigation based on a signal obtained from the vehicle behavior sensor with the current-time position taken as the starting point (S330).

Thereafter, the control part 60 continues the driving assist control until the ignition switch enters the off-state.

Meanwhile, in S270 to which the process is moved when the roadside-device information has not been received (S210: NO), the control part 60 determines whether the other-vehicle information has been received via the wireless communication part 58 (S270).

The process is moved to S270 also when the current roadside-device position and the stored roadside-device position do not match each other (S220: NO), or when the first device-to-device distance is not smaller than the first distance threshold (S250: NO), or when the first power difference exceeds the prescribed value (S260: NO).

When the other-vehicle information has not been received as a result of the determination in S270 (S270: NO), the control part 60 moves the process to S340 as described in detail later. On the other hand, when the other-vehicle information has been received as a result of the determination in S270 (S270: YES), the control part 60 calculates a second device-to-device distance (S280).

The second device-to-device distance mentioned here is a distance from the current other-device position to the stored position. In S280 of the present embodiment, a linear distance between the latitude and longitude of the current other-device position and the latitude and longitude of the stored position may simply be calculated as the second device-to-device distance. The current other-device position is the other-device position included in the other-vehicle information received in S270, and are the latitude and longitude representing the current position of the other vehicle.

In the driving assist control process, the control part 60 determines whether the second device-to-device distance is smaller than a prescribed second distance threshold (S300). The second distance threshold mentioned here is a distance from the current position of the other vehicle AM to the current position of the subject vehicle, which permits execution of the following assist control as the driving assist control.

When the second device-to-device distance is not smaller than the second distance threshold as a result of the determination in S300 (S300: NO), the control part 60 moves the process to S340. On the other hand, when the second device-to-device distance is smaller than the second distance threshold as a result of the determination in S300 (S300: YES), the control part 60 moves the process to S310.

In S310, the control part 60 determines whether the current other-vehicle information reception power is within a prescribed range. The current other-vehicle information reception power is the other-vehicle information reception power received in S270.

Figure 6:
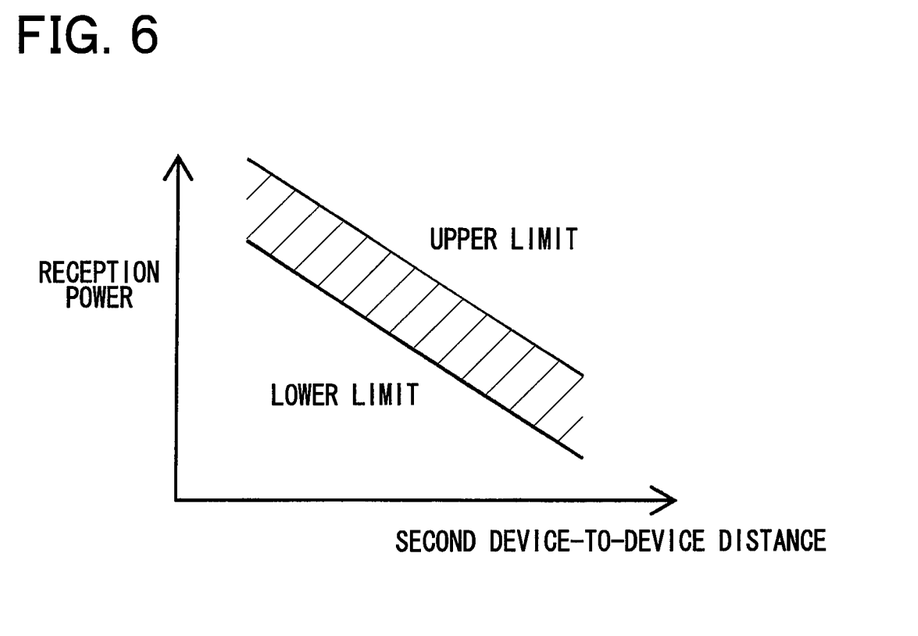
FIG. 6 is a diagram describing prescribed range.

Further, the prescribed range mentioned here is a range prescribed as a range for normally assumed reception power with respect to the second device-to-device distance. For example, as shown in FIG. 6, this prescribed range may be prescribed as a range from a lower limit value to an upper limit value, the lower limit value being a larger as the second device-to-device distance is shorter, the upper limit value being a larger than the lower limit value as the second device-to-device distance is shorter. The range of the normally assumed reception power may be derived from the range of the reception power actually measured in a variety of environments on a public road, or may be theoretically derived from a propagation model.

When the current other-vehicle information reception power is out of the prescribed range as a result of the determination in S310 (S310: NO), the control part 60 moves the process to S340. On the other hand, when the current other-vehicle information reception power is within the prescribed range as a result of the determination in S310 (S310: YES), the control part 60 moves the process to S320.

In S320, the control part 60 sets the stored position as the current-time position of the subject vehicle. The control part 60 subsequently activates and starts the driving assist control process based on the current position of the subject vehicle, the roadside-device information received from the roadside device 10, and the other-vehicle information received from the other-vehicle in-vehicle device 50, the current position being derived by the autonomous navigation based on a signal obtained from the vehicle behavior sensor with the current-time position taken as the starting point (S330).

Thereafter, the control part 60 continues the driving assist control until the ignition switch enters the off-state.

Meanwhile, in S340 to which the process is moved when the other-vehicle information has not been received, the control part 60 newly derives the current position of the subject vehicle and sets the derived current position as the current-time position. In S340, the control part 60 derives the current position of the subject vehicle to the satellite positioning system by a known technique based on signals received from multiple (at least four or more) navigation satellites.

The control part 60 then moves the driving assist control process to S330, to activate and starts the driving assist control based on the current position, the roadside-device information received from the roadside device 10, and the other-vehicle information received from the other-vehicle in-vehicle device 50.

Thereafter, the control part 60 continues the driving assist control until the ignition switch enters the off-state.

That is, when the ignition switch of the subject vehicle enters the off-state, the current position of the subject vehicle at that point is stored into the nonvolatile storage device 56, and thereafter the driving assist control process is finished.

An overview of the driving assist control process immediately after turning-on of the ignition switch will be described.

When the ignition switch of the subject vehicle enters the on-state, the driving assist control process is activated. In the activated driving assist control process, the distance between the stored position and the position of the roadside device 10, having been acquired after the ignition switch entering the on-state, or the position of the other-vehicle in-vehicle device 50 (that is, the first device-to-device distance or the second device-to-device distance) is calculated. Further in the driving assist control process, distance determination is executed where it is determined whether the first device-to-device distance or the second device-to-device distance is smaller than the first distance threshold or the second distance threshold.

When the first device-to-device distance or the second device-to-device distance is smaller than the first distance threshold or the second distance threshold as a result of this distance determination, the subject vehicle is not likely to have been moved when the ignition switch is in the off-state. Hence, in the driving assist control process, the stored position stored in the nonvolatile storage device 56 is set as the current-time position.

On the other hand, when the first device-to-device distance or the second device-to-device distance is not smaller than the first distance threshold or the second distance threshold as a result of this distance determination, the subject vehicle is likely to have been moved when the ignition switch is in the off-state. Hence, in the in-vehicle control device 50, the current position of the subject vehicle is newly derived and acquired based on signals newly received from the navigation satellites, and the newly derived current position of the subject vehicle is set as the current-time position.

Then, the driving assist control process is executed based on the current position of the subject vehicle, the roadside-device information received from the roadside device 10, and the other-vehicle information received from the other-vehicle in-vehicle device 50, the current position being derived by the autonomous navigation based on a signal obtained from the vehicle behavior sensor with the current-time position taken as the starting point.

As described above, in the in-vehicle control device 50, the stored position stored in the nonvolatile storage device 56 can be set as the current-time position on the assumption that the subject vehicle has not been moved while the ignition switch is in the off-state when the first device-to-device distance or the second device-to-device distance is smaller than the first distance threshold or the second distance threshold.

Thus, according to the in-vehicle control device 50, it may be possible to set a highly reliable current-time position at an early point immediately after the ignition switch entering the on-state.

Furthermore, in the in-vehicle control device 50, the driving assist control is started based on the set current-time position. As a result, according to the in-vehicle control device 50, it may be possible to execute the driving assist control immediately after the ignition switch entering the on-state.

Meanwhile, in the driving assist control process, when the device-to-device distance is not smaller than the distance threshold, the current position of the subject vehicle is newly derived and acquired based on signals newly received from the navigation satellites, and the newly derived current position of the subject vehicle is set as the current-time position.

Thus, according to the in-vehicle control device 50, when the subject vehicle is likely to have been moved during a period in which the ignition switch is in the off-state, the driving assist control can be executed after derivation of a highly reliable current position of the subject vehicle. As a result, according to the in-vehicle control device 50, it may be possible to further improve the safety of the driving assist control.

In the driving assist control process, it is determined whether the subject vehicle has been moved when the ignition switch is in the off-state by determining whether the magnitude of the roadside-device information reception power matches, or whether the stored device position of the roadside device and the current device position match each other.

With this determination, it may be possible to more easily achieve the determination as to whether the subject vehicle has been moved when the ignition switch is in the off-state.

Further, as in the driving assist control process, the determination as to whether the subject vehicle has been moved when the ignition switch is in the off-state is executed by the distance determination or the determination as to whether the magnitude of the other-vehicle information reception power is within the prescribed range. As a result, according to the driving assist control process, it may be possible to improve the accuracy in determination as to whether the subject vehicle has been moved when the ignition switch is in the off-state.

Other Embodiments

Although the embodiment of the present disclosure has been described above, the present disclosure is not restricted to the above embodiment, but can be carried out in a variety of modes in a scope not deviating from the gist of the present disclosure.

For example, in S260 of the above embodiment, the target for determination as to whether to be not larger than the prescribed value has been the first power difference, but the target for determination as to whether to be not larger than the prescribed value in S260 is not restricted to the first power difference.

That is, in S260, the target for determination as to whether to be not larger than the prescribed value may be reception power for the roadside-device information. The prescribed value in this case may be a range (for example, prescribed range) prescribed as a range of the reception power for the roadside-device information, and permitting execution of the driving assist control.

This prescribed range may, for example, be prescribed as a range from a lower limit value to an upper limit value, the lower limit value being a larger as the first device-to-device distance is shorter, the upper limit value being a larger than the lower limit value as the first device-to-device distance is shorter.

Figure 7:
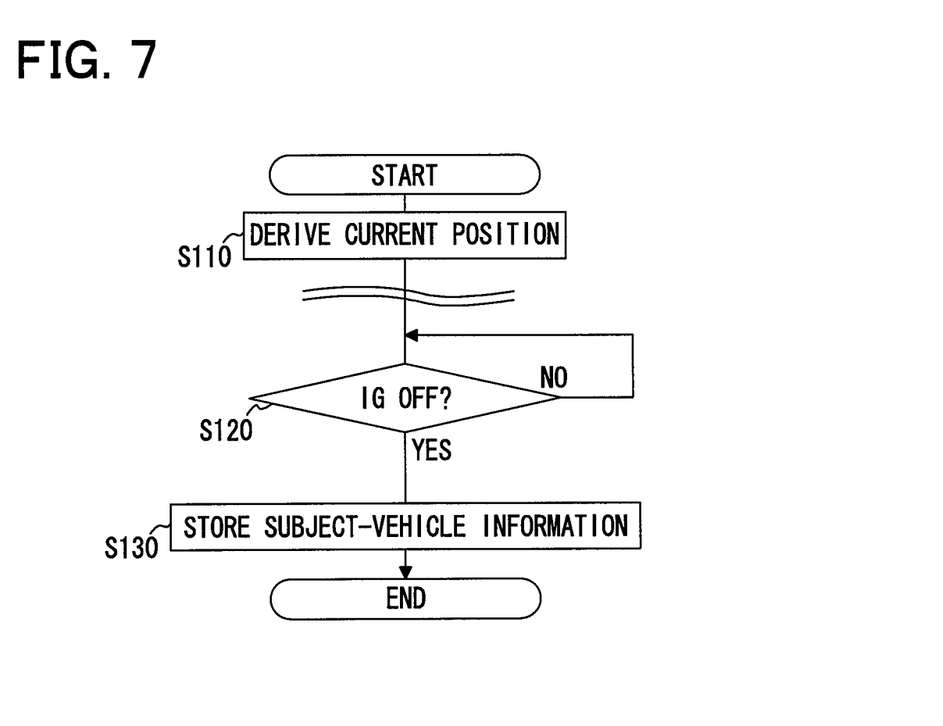
FIG. 7 is a flowchart showing a modification of a process with the ignition off.

Meanwhile, S140 and S150 have been executed at the stage of finishing the driving assist control process in the above embodiment, but in the present disclosure, one of S140 and S150 may be omitted, or both S140 and S150 may be omitted as shown in FIG. 7.

For example, when S140 is omitted at the stage of finishing the driving assist control process, S220 may be omitted, S240 and S260 may be omitted, or all the steps of S220, S240, and S260 may be omitted at the stage of starting the driving assist control process. Moreover, when S150 is omitted at the stage of finishing the driving assist control process, S310 may be omitted at the stage of starting the driving assist control process.

Furthermore, at the stage of starting the driving assist control process, all the steps of S210 to S260 may be omitted or all the steps of S270 to S310 may be omitted.

In the present disclosure, the target for calculation of the first device-to-device distance may be the roadside-device position included in the roadside-device information, for which the reception power is the largest. Moreover, in the present disclosure, the target for calculation of the second device-to-device distance may be the other-device position included in the other-vehicle information, for which the reception power is the largest.

When the first device-to-device distance or the second device-to-device distance as thus described is calculated, the accuracy in each determination can be enhanced by calculating the distance between the in-vehicle control device 50 and the other vehicle or the roadside device which is present in the nearest position from the subject vehicle at the point when the ignition switch enters the on-state.

Meanwhile, the target for mounting of the control device 50 is not restricted to the four-wheeled vehicle AM. For example, the control device 50 may be mounted in a two-wheeled vehicle, may be mounted a special vehicle, may be mounted in a light vehicle such as a bicycle, or may be mounted in the other vehicle.

Further, the control device in the present disclosure is not restricted to the control device that is mounted in the vehicle, but may be configured as a control device included in an information terminal owned by a person. In this case, the control device provided in the information terminal may execute the above-described driving assist control process by replacing the "subject vehicle" with the "control device", replacing the "ignition switch" with the "power switch", replacing "the other-vehicle in-vehicle device 50 and the other-vehicle information received from the other-vehicle in-vehicle device 50" with "an information terminal owned by the other and the other-terminal information received from the information terminal owned by the other", and replacing "the driving assist control" with "assist control".

The other-terminal information mentioned here includes information representing the position of the information terminal, similarly to the other-vehicle information. Further, the "assist control" mentioned here is control to assist movement of the person owning the information terminal. As an example of the assist control, there is considered control to notify a relative positional relation between the current position of the control device and a specific position based on the device position information from the specific device, the current position being derived by the autonomous navigation with the current-time position taken as the starting point. The reception power for the roadside-device information and the reception power for the other-vehicle information are each an example of the device reception power. The control part 60, S250, and S300 each correspond to an example of the distance determination section. The control part 60, S230, and S280 each correspond to an example of the distance calculation section. The control part 60, S210, and S270 each correspond to an example of the information acquisition section. The control part 60, S220, and S330 each correspond to an example of the control execution section. The wireless communication part 14 and the control part 18 each correspond to an example of the information transmission part. The control part 60 and S130 each correspond to an example of the storage control section. The control device 50 and S220 each correspond to an example of the position determination section.

A mode in which part of the configuration of the above embodiment is omitted is also an embodiment of the present disclosure. Further, a mode configured appropriately combining the above embodiment with a modification is also an embodiment of the present disclosure.

It is noted that a flowchart or the processing of the flowchart in the present application includes multiple steps (also referred to as sections), each of which is represented, for instance, as S110. Further, each step can be divided into several sub-steps while several steps can be combined into a single step.

While various embodiments, configurations, and aspects of a control device and an assist system according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A control device comprising:
a position acquisition section that acquires a current position derived from a signal received from a navigation satellite;
an information acquisition section that acquires device position information including a device position that represents a position of a specific device, being another device or a roadside device, from the specific device;
a storage control section that stores into a nonvolatile storage device the current position of the control device, acquired in the position acquisition section, when a power switch is switched to an off-state; and
a control execution section that executes driving assist control when the power switch enters an on-state, based on a current-time position representing a position at a point when the power switch enters the on-state and on the device position information from the specific device,
wherein:
the control execution section includes
a distance calculation section that calculates a device-to-device distance which is a distance between the device position acquired in the information acquisition section and a stored position being the current position stored in the nonvolatile storage device, based on the device position and the stored position, and
a distance determination section that executes distance determination to determine whether the device-to-device distance calculated in the distance calculation section is smaller than a distance threshold which is a prescribed distance;
when the device-to-device distance is smaller than the distance threshold as a result of the distance determination in the distance determination section, the control execution section sets the stored position as the current-time position of the control device and starts to execute the driving assist control;
the storage control section stores the device position information of the roadside device, acquired in the information acquisition section, into the nonvolatile storage device when the power switch is switched to the off-state;
the control execution section includes a position determination section that executes position determination to determine whether a stored device position, being the device position stored in the nonvolatile storage device, matches a current device position being the device position newly acquired in the information acquisition section, when the power switch switches to the on-state; and
when the stored device position matches the current device position as a result of the position determination in the position determination section, the control execution section sets the stored position as the current-time position, and starts to execute the driving assist control.

2. The control device according to claim 1, wherein:
when the device-to-device distance is equal to or greater than the distance threshold as a result of the distance determination in the distance determination section, the control execution section sets a current position, newly acquired in the position acquisition section, as the current-time position, and starts to execute the driving assist control.

3. The control device according to claim 1, wherein:
the control execution section detects device reception power representing reception power of the device position information acquired in the information acquisition section.

4. The control device according to claim 3, wherein:
the distance calculation section calculates, as the device-to-device distance, a distance between the stored position and the device position included in the device position information, for which the device reception power is a largest.

5. The control device according to claim 3, wherein:
when the device reception power is within a prescribed range prescribed as a range of the reception power for permitting execution of the driving assist control, the control execution section sets the stored position as the current-time position and starts to execute the driving assist control.

6. A control device comprising:
a position acquisition section that acquires a current position derived from a signal received from a navigation satellite;
an information acquisition section that acquires device position information including a device position that represents a position of a specific device, being another device or a roadside device, from the specific device;
a storage control section that stores into a nonvolatile storage device the current position of the control device, acquired in the position acquisition section, when a power switch is switched to an off-state; and
a control execution section that executes driving assist control when the power switch enters an on-state, based on a current-time position representing a position at a point when the power switch enters the on-state and on the device position information from the specific device,
wherein:
the control execution section includes
a distance calculation section that calculates a device-to-device distance which is a distance between the device position acquired in the information acquisition section and a stored position being the current position stored in the nonvolatile storage device, based on the device position and the stored position, and
a distance determination section that executes distance determination to determine whether the device-to-device distance calculated in the distance calculation section is smaller than a distance threshold which is a prescribed distance;
when the device-to-device distance is smaller than the distance threshold as a result of the distance determination in the distance determination section, the control execution section sets the stored position as the current-time position of the control device and starts to execute the driving assist control;
when the power switch is switched to the off-state, the storage control section stores, into the nonvolatile storage device, the reception power of the device position information acquired in the information acquisition section in association with the device position information;
the control execution section determines whether a difference between stored power and current reception power is within a prescribed range when the power switch is switched to the on-state, the stored power being the reception power of the device position information stored in the nonvolatile storage device, the current reception power being reception power of the device position information newly acquired in the information acquisition section; and
when the difference between the stored power and the current reception power is within the prescribed range as a result of the determination regarding whether the difference between the stored power and the current reception power is within the prescribed range, the control execution section sets the stored position as the current-time position, and starts to execute the driving assist control.

7. An assist system that executes assist control, the assist system comprising:
a control device; and
a specific device being another device or a roadside device,
wherein:
the assist control is executed in accordance with a result of wireless communication between the control device and the specific device;
the specific device includes an information transmission part that transmits device position information including a device position which represents a position of the specific device;
the control device includes
a position acquisition section that acquires a current position derived from a signal received from a navigation satellite,
an information acquisition section that acquires device position information from the information transmission part,
a storage control section that stores into a nonvolatile storage device the current position of the control device, acquired in the position acquisition section, when a power switch is switched to an off-state, and
a control execution section that executes assist control when the power switch enters an on-state, based on a current-time position representing a position at a point when the power switch enters the on-state and the device position information from the specific device;
the control execution section includes
a distance calculation section that calculates a device-to-device distance which is a distance between the device position acquired in the information acquisition section and the stored position being the current position stored in the nonvolatile storage device, based on the device position and the stored position, and
a distance determination section that executes distance determination to determine whether the device-to-device distance calculated in the distance calculation section is smaller than a distance threshold which is a prescribed distance;
when the device-to-device distance is smaller than the distance threshold as a result of the distance determination in the distance determination section, the control execution section sets the stored position as the current-time position, and starts to execute the assist control;
the storage control section stores the device position information of the roadside device, acquired in the information acquisition section, into the nonvolatile storage device when the power switch is switched to the off-state;
the control execution section includes a position determination section that executes position determination to determine whether a stored device position, being the device position stored in the nonvolatile storage device, matches a current device position being the device position newly acquired in the information acquisition section, when the power switch switches to the on-state; and when the stored device position matches the current device position as a result of the position determination in the position determination section, the control execution section sets the stored position as the current-time position, and starts to execute the assist control.

8. An assist system that executes assist control, the assist system comprising:

a control device; and a specific device being another device or a roadside device, wherein:

the assist control is executed in accordance with a result of wireless communication between the control device and the specific device;

the specific device includes an information transmission part that transmits device position information including a device position which represents a position of the specific device;

the control device includes a position acquisition section that acquires a current position derived from a signal received from a navigation satellite, an information acquisition section that acquires device position information from the information transmission part, a storage control section that stores into a nonvolatile storage device the current position of the control device, acquired in the position acquisition section, when a power switch is switched to an off-state, and a control execution section that executes assist control when the power switch enters an on-state, based on a current-time position representing a position at a point when the power switch enters the on-state and the device position information from the specific device;

the control execution section includes a distance calculation section that calculates a device-to-device distance which is a distance between the device position acquired in the information acquisition section and the stored position being the current position stored in the nonvolatile storage device, based on the device position and the stored position, and a distance determination section that executes distance determination to determine whether the device-to-device distance calculated in the distance calculation section is smaller than a distance threshold which is a prescribed distance;

when the device-to-device distance is smaller than the distance threshold as a result of the distance determination in the distance determination section, the control execution section sets the stored position as the current-time position, and starts to execute the assist control;

when the power switch is switched to the off-state, the storage control section stores, into the nonvolatile storage device, the reception power of the device position information acquired in the information acquisition section in association with the device position information;

the control execution section determines whether a difference between stored power and current reception power is within a prescribed range when the power switch is switched to the on-state, the stored power being the reception power of the device position information stored in the nonvolatile storage device, the current reception power being reception power of the device position information newly acquired in the information acquisition section; and when the difference between the stored power and the current reception power is within the prescribed range as a result of the determination regarding whether the difference between the stored power and the current reception power is within the prescribed range, the control execution section sets the stored position as the current-time position, and starts to execute the assist control.

* * * * *